(No Model.)

I. I. FONDA.
BICYCLE STAND.

No. 529,827. Patented Nov. 27, 1894.

Witnesses
J. D. Thornton
N. W. Green

Inventor
Isaac I. Fonda
by J. W. Porter Atty

THE NORRIS PETERS CO., PHOTO-LITHO., WASHINGTON, D. C.

UNITED STATES PATENT OFFICE.

ISAAC I. FONDA, OF BOSTON, MASSACHUSETTS.

BICYCLE-STAND.

SPECIFICATION forming part of Letters Patent No. 529,827, dated November 27, 1894.

Application filed May 23, 1894. Serial No. 512,211. (No model.)

*To all whom it may concern:*

Be it known that I, ISAAC I. FONDA, of Boston, in the county of Suffolk and State of Massachusetts, have invented a new and useful Improvement in Bicycle-Stands, which will, in connection with the accompanying drawings, be hereinafter fully described, and specifically defined in the appended claims.

Figure 1:
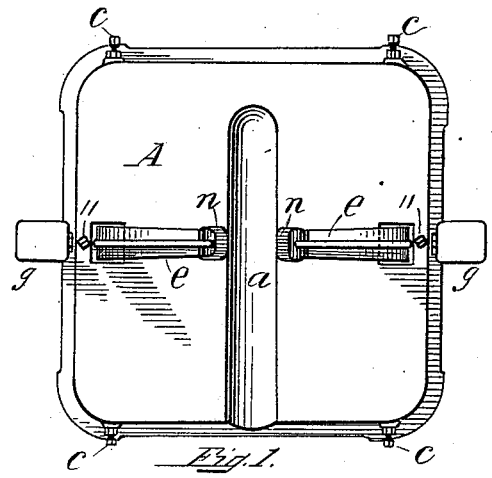
Figure 2:
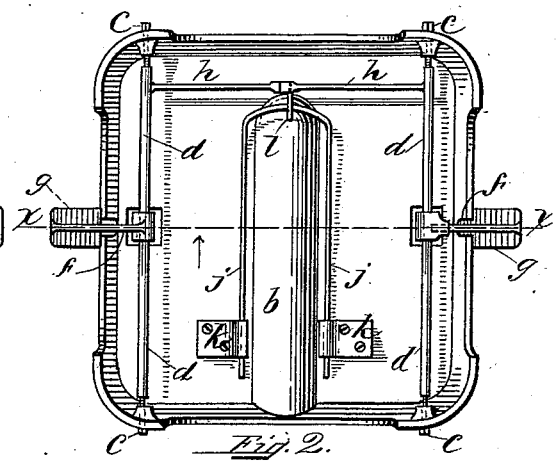
Figure 3:
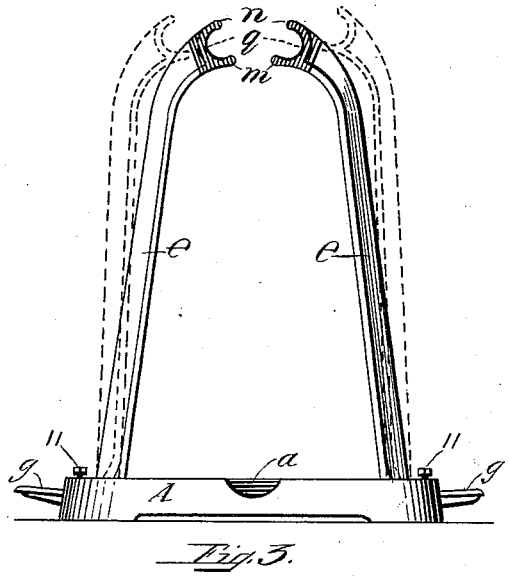
Figure 4:
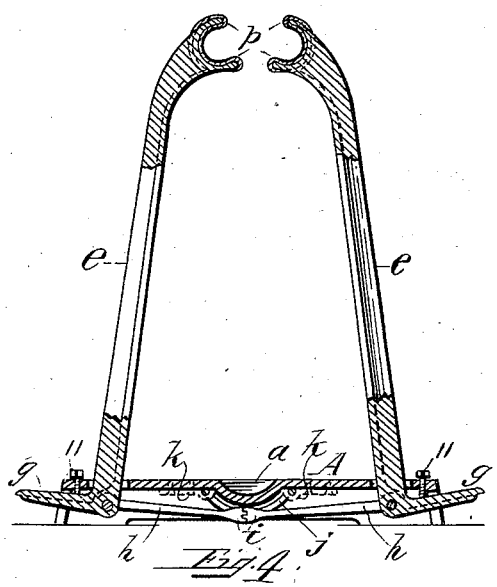
Figure 5:
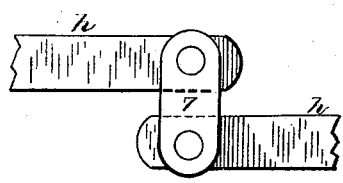

In said drawings: Figure 1, is a top plan view of my invention. Fig. 2. is an inverted or under side plan view of the invention shown in Fig. 1. Fig. 3. is a side elevation of Fig. 1 taken as viewed from the near side of said Fig. 1. Fig. 4. is a central section on line $x$, $x$, Fig. 2. Fig. 5. is a modification of the means of connecting together the arms that are beneath the bed; and Fig. 6. is yet another modification to the same purpose.

This invention relates to stands in which bicycles are placed when not in use; and it consists in a base having two arms rising above the same and pivoted thereto and provided with interlocking arms actuated by a spring so that said vertical arms move in unison toward and from each other, there being treadles connected with said arms by which they can by the action of the foot be moved apart and are moved toward each other by said spring, said arms being at their top formed to receive and hold the part of the bicycle that is presented thereto, all as will be herein specified and claimed.

Referring to said drawings A represents the bed of my bicycle stand which is preferably of about equal sides, and having rounded corners as shown, and there is preferably formed in the top thereof a groove $a$ by the depression of the top as shown at $b$, such depression extending nearly but not entirely across said bed. At each of the four corners of bed A is inserted the screw $c$ which passing through the side wall of A serve as pivots on which rods $d$, $d$ are mounted. Centrally on said rods $d$ are the arms $e$, $e$ which pass loosely up through bed A and extending above the same serve as will be explained to grasp and hold the bicycle. From said arms $e$ and extending out through bed A are the short arms $f$ that at their outer ends support the small treadle pads $g$, $g$ as shown. At the side of bed A where groove $a$ does not extend, a pair of arms $h$ formed upon or attached to rods $d$ extend inward and at their meeting ends are toothed together as shown at $i$ Fig. 4. Spring $j$, $j$, of elastic wire, is laid along the sides of the wall $b$ of groove $a$ and is held in place by the binders $k$, $k$ secured to bed A, its front or loop end passing beneath the pin $l$ that extends from one of the arms $h$ for that purpose, said spring thus constantly tending by its downward pressure on arms $h$ to force arms $e$ inward. At the top of arms $e$ they are formed with open lips $m$ and $n$ thus leaving a recessed throat $q$ in which the rods of the bicycle are grasped and held, a properly formed elastic rubber cap $p$ being drawn over said lips and throat and being self retained in place by its clinging to the ribs formed adjacent to the outlines of said throat.

Figure 6:
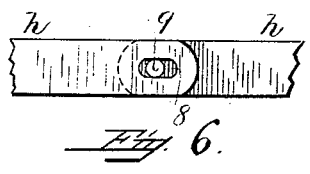

Instead of interlocking the ends of arms $h$ as shown in Fig. 4 they may be connected by a link 7 as shown in Fig. 5; or they may be connected as shown in Fig. 6, where an elongated hole 8 is formed in one arm and a pin 9 inserted in the other arm extends into said hole so that the two arms must move together. The rods $d$ can be formed integral with arms $e$, or said rods may be inserted in the lower ends of said arms $e$, as shown at the left in Fig. 4, and the rods $f$, may be formed integral with arms $e$ or they may be inserted therein, and the treadle pads $g$ may be formed as part of rods $f$, or said rods may be inserted in said pads.

It will be obvious that various changes may be made in the details of my invention without departing from the essential nature thereof.

Instead of a spring as shown at $j$ a coiled or a leaf spring can be employed if in any case either is desired. The inward movement of arms $e$ may be controlled by screws 11, threaded in the top of base A.

Having thus explained my invention, what I claim as new is—

1. In a bicycle support, the combination of a suitable base, a pair of pivoted arms adapted to grasp the bicycle, rising above said base, a spring to force said arms inward or toward each other and a device arranged to be actuated by the foot of the user to force said arms asunder, all substantially as specified.

2. In a bicycle holder the combination of a base, as A, a pair of pivotal arms as *e*, a treadle or treadles *g*, arranged to force said arms apart, and a spring as *j* to force said arms toward each other, substantially as specified.

3. In a bicycle holder, the combination of bed A, arms *e* formed to grasp the bicycle and provided with pivoted rods *d*, treadles *g* and arms *h* interlocked and actuated by a spring, substantially as specified.

ISAAC I. FONDA.

Witnesses:
T. W. PORTER,
N. W. GREEN.